United States Patent Office 3,728,332
Patented Apr. 17, 1973

3,728,332
PREPARATION OF STARCH ESTERS
Martin M. Tessler, Edison, and Morton W. Rutenberg, North Plainfield, N.J., assignors to National Starch and Chemical Corporation, New York, N.Y.
No Drawing. Filed Sept. 3, 1971, Ser. No. 177,777
Int. Cl. C08b 19/04
U.S. Cl. 260—233.5                   7 Claims

ABSTRACT OF THE DISCLOSURE

Starch dispersions in aqueous or non-aqueous media are reacted with acyl guanidines to produce starch esters.

---

This invention relates to a novel method for the preparation of starch esters and more particularly to a method of preparing such esters by reacting starch with acyl guanidines.

The modification of starch by chemical derivatization and in particular the preparation of starch esters is well known in the art. An excellent review of the preparation of starch esters up to 1968 may be found in J. A. Radley, Starch and Its Derivatives, Chapman and Hall, Ltd., Chapter 12. However, the prior art does not teach the preparation of starch derivatives by reaction of starch with acyl guanidines.

We have now discovered that it is possible to prepare starch ester derivatives by reacting starch with acyl guanidines in an aqueous medium or a non-aqueous medium at room temperature.

It is an object of this invention to provide a novel method for the preparation of inhibited starch products containing labile ester linkages so as to permit these linkages to be subsequently controllably and readily destroyed or eliminated, and whose presence permits these products to exhibit a combination of inhibited and normal swelling characteristics.

Another object of this invention is to prepare inhibited starch products that are free of the undesired effects of non-crosslinked substitution onto starch, as for example, acetylation.

A further object of this invention is to provide a convenient and economical new reaction for chemically altering the paste properties of starch by a reaction which proceeds rapidly with aqueous slurries or with dispersions of starch in water at room temperature.

Various other objects and advantages of this invention will be apparent from the following description.

The objects of this invention are accomplished by reacting starch with acyl guanidines.

According to this invention an aqueous suspension or dispersion of starch or a starch derivative is reacted with a guanidine derivative of a carboxylic acid to produce a starch ester derivative. If guanidine derivatives of monofunctional carboxylic acids are used, the products obtained are stabilized starch ester derivatives. If guanidine derivatives of polyfunctional carboxylic acids are used in the process of this invention cross-linked starch esters may be prepared. The reaction may be carried out at temperatures ranging from somewhat below to somewhat above room temperature. By a suitable choice of starting materials, reagents, and reaction conditions very useful modified starches may be prepared easily and conveniently as will be explained more fully hereinafter.

The starch base materials which may be used in preparing the starch ester products according to this invention may be derived from any plant source including corn, potato, sweet potato, wheat, rice, sago, tapioca, waxy maize, sorghum, high amylose corn or the like. Also included are the conversion products derived from any of the above starch bases including, for example, dextrines prepared by the hydrolytic action of acid and/or heat; oxidized starches prepared by treatment with oxidants such as sodium hypochlorite; and fluidity or thin boiling starches prepared by enzyme conversion or by mild acid hydrolysis. The term "starch base" is thus seen to include any amylaceous substances, whether untreated or chemically modified, which, however, still retain free hydroxyl groups capable of entering into the acylation reaction. If the desired product is to be granular starch, obviously the initial starting material must be in granular form. It is to be noted that the process of this invention may also be carried out employing gelatinized starches which will result in the production of non-granular starch ester products.

The acyl guanidines used in the process of this invention are compounds corresponding to the general formulas:

I

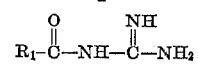

and

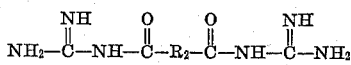

where $R_1$ is selected from the group consisting of alkyl, substituted alkyl, unsaturated alkyl, cycloalkyl, aryl, substituted aryl, and aralkyl, and $R_2$ is selected from the group consisting of alkylene, substituted alkylene, bis-alkylene ether, cycloalkylene, arylene, and substituted arylene. $R_1$ and $R_2$ may each contain between one and twenty carbon atoms.

It is to be noted that additional compounds analogous to the compounds of structure II but having more than two carboxyl groups attached to $R_2$ may also be used to prepare inhibited starches according to this invention.

Suitable guanidine derivatives of carboxylic acids corresponding to structures I and II may be prepared using acids such as, for example, acetic acid, propionic acid, benzoic acid, phenylacetic acid, n-butyric acid, oleic acid, lauric acid, stearic acid, terephthalic acid, 1,4-cyclohexane-dicarboxylic acid, succinic acid and adipic acid.

The preparation of acyl guanidines of monocarboxylic acids is described in J. K. Simons and W. I. Weaver, U.S. Pat. 2,408,694. The same procedure may be used to prepare guanidine derivatives of polycarboxylic acids. In general, esters of the selected carboxylic acids are reacted with guanidine in ethanol solution, and the insoluble acyl guanidines are recovered by filtration.

The novel process of this invention comprises reacting a selected acyl guanidine, such as described hereinabove, with a selected starch base which is ordinarily suspended in water. The reaction of the acyl guanidine with the suspended starch is carried out at temperatures ranging from about 35° to 120° F. and preferably at 70° to 100° F. and for a period of from 1 to 24 hours. The pH of the reaction mixture is ordinarily controlled so as to be above 4.0 and below 11.0 with the preferred range being from about 7.0 to about 10.0. The pH is conveniently controlled by the periodic addition of a dilute aqueous solution of hydroboric acid, but other common acids, such as sulfuric or acetic, may also be used with equal success.

Aqueous suspensions are preferred, but the reaction may be carried out, if desired, in a non-aqueous system by suspending the starch base in any common organic solvent as, for example, p-dioxane, toluene, dichloromethane, and the like, and then adding the acyl guanidine.

The amount of acyl guanidine used to react with the starch base may vary from about 0.05% to 100%, based on the dry weight of the starch, depending on such factors as the starch base employed, the degree of stabilization or inhibition which is desired in the end product, and the particular guanidine reagent.

Reaction time will vary from about 1.0 hour to about 24 hours depending on such factors as the reactivity of the reagent used, the amount of the reagent used, the temperature employed, etc. After completion of the reaction, the pH of the reaction mixture is preferably adjusted to a pH of from about 5.0 to about 7.0 with any common acid such as hydrochloric acid, sulfuric acid, acetic acid, or the like, or common base such as 3.0% aqueous sodium hydroxide. The pH of the reaction will determine whether acid or base is required. The resultant starch product is then recovered by filtration, washed free of residual salts with water, and dried. Alternatively the washed product may be drum dried or spray dried, or gelatinized and isolated by alcohol precipitation.

It is to be noted that a large number of variations may be effected in reacting the starch base with acyl guanidines in accordance with the reaction procedure described above without materially departing from the spirit of the invention. Such variations will be evident to those skilled in the art.

The starch products resulting from the practice of this invention are starch esters, with the general reactions employing acyl guanidines I and II being represented as follows:

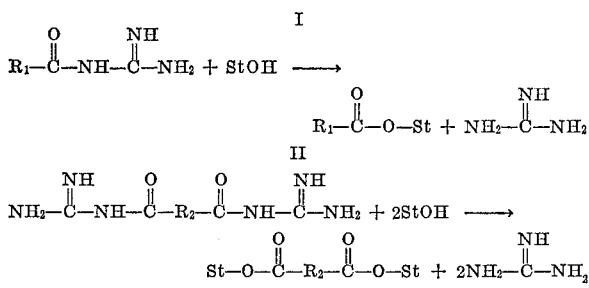

wherein StOH represents the starch molecule and $R_1$ and $R_2$ are as defined hereinabove. These are schematic equations which describe the chemical changes occurring during the reaction. The practitioner will recognize that the starch molecule is a polymer of glucose and contains three free hydroxyl groups per anhydroglucose unit in the polymer. (The non-reducing end glucose units contain four free hydroxyl groups.) Each of these hydroxyl groups can react as described in these equations. It is also known that the relative reactivity of each of the hydroxyl groups is not equivalent, some being more reactive than others, and that many hydroxyl groups from the same starch molecule will react to give the products of this invention.

The inhibited, granular products formed in Equation II may show varying degrees of inhibition depending upon the extent of the reaction and the consequent number of resulting crosslinkages. The amount of granule inhibition may be determined by performing a sediment volume test. In this procedure, an aqueous suspension of the inhibited product having a concentration of 1%, by weight, solids is cooked on a boiling water bath for about 30 minutes. The resulting dispersion is then allowed to stand in a graduated vessel, such as a 100 ml. graduated cylinder, at room temperature for a period of about 16 hours. The cooked product will separate into layers on the basis of relative inhibition. In extreme cases it will completely settle out with the sediment so formed occupying different volumes depending on the degree of inhibition of the reaction product. These sediments are composed of insoluble granules of the starch derivative whose swollen volumes are relative to the degree of inhibition of the derivatives. Thus, because of their lower swelling and hydration capacity, the more inhibited, i.e., the more cross-linked products will yield smaller sediment volumes than correspondingly less inhibited products. Where, however, the original starch base exhibits no sediment formation because of the completely swollen, highly hydrated and/or disrupted nature of its granules, e.g., in the case of waxy maize starch, inhibition in the product will be evidenced by the subsequent formation of sediment. The result is directly attributable to the toughened state of the cross-linked granules.

The cross-linked products of this invention, because of their unique properties, can be utilized in many applications. Thus, in the food industry, they can be used as thickening agents for pies, sauces, soups, etc. They are of particular interest in the canning industry as a result of their unique behaviour during retorting of the canned food products. In the retorting process the crosslinkages of the inhibited starch products of this invention are initially intact and the starch dispersion is in a thin state, thereby enabling the heat utilized for sterilizing the food product to penetrate the can and its contents rapidly. As the heating is continued, however, the crosslinkages of the inhibited starch thickeners are destroyed thereby activating their delayed thickening properties to produce desirable high viscosity dispersions. The cross-linked products of this invention may also be used in various sizing, coating, and adhesive applications. In addition, these novel starch products may be used as dusting powders for surgical and cosmetic purposes, etc.

The stabilized cereal starch ester products of this invention formed in Equation I are characterized by the stability of their dispersions. Thus the cooked pastes derived from the water dispersible form of these esters display improved clarity and resistance to gelling on cooling. This highly desired property permits these derivatives of this invention to be widely utilized as, for example, in the sizing of paper and textiles, and in foods. Another characteristic of the starch products of this invention is lowered gelatinization temperature as compared to untreated starch. This is of importance in many industrial processes (particularly in food manufacture), since it permits operation at lower temperatures.

The following examples will illustrate the practice of this invention, but are not intended to limit its scope. In this examples, all parts given are by weight unless otherwise indicated.

EXAMPLE I

This example illustrates the use of various acyl guanidines in preparing starch esters according to this invention by means of milk reactions wherein the resulting products are not inhibited and display an intact granule structure.

In preparing the derivatives listed in Table I, 1.0 part of corn starch was suspended in 1.25 parts of water whereupon the indicated amounts of the selected acyl guanidine were introduced. The pH was controlled at the indicated value by periodic addition of dilute hydrochloric acid during the entire course of the reaction. The reaction was allowed to proceed with agitation at room temperature until there was no further change in pH. The resulting starch ester derivatives were then acidified with dilute sulfuric or hydrochloric acid, recovered by filtration, and subsequently washed with water to remove residual salts.

Table I gives the pertinent data for the various derivatives which were prepared. Each reacted starch was examined for acyl content, calculated from the saponification number.

TABLE I

| Derivative number | Esterification reagent Guanidine derivative of— | Percent on starch | Controlled pH | Time, hrs. | Percent acyl |
|---|---|---|---|---|---|
| 1 | Stearic acid | 10.0 | 8.0 | 16 | 1.38 |
| 2 | Phenylacetic acid | 10.0 | 8.0 | 16 | 0.90 |
| 3 | Acetic acid | 8.0 | 8.0 | 16 | 1.32 |
| 4 | Benzoic acid | 6.7 | 8.0 | 24 | 0.23 |

EXAMPLE II

This example illustrates the use of acyl guanidines in preparing inhibited starch esters according to this invention by means of milk reactions.

In preparing the derivatives listed in Table II, 1.0 part of each of the listed starch bases was suspended in 1.25 to 1.50 parts of water, whereupon the indicated amounts of acyl guanidines were introduced. The pH was controlled at the indicated value by the periodic addition of dilute hydrochloric acid during the course of the reaction. The reaction was allowed to proceed with agitation at the desired temperature until there was no further change in pH. This usually required about one hour. Stirring for an additional 15 hours give a slight improvement in reaction efficiency. The resulting starch ester derivatives were then acidified with dilute sulfuric or hydrochloric acid, recovered by filtration, and washed with water to remove residual salts.

Table II presents the pertinent data relating to the various starch derivatives of this example and their preparation.

significant increase in viscosity and formed a gel after 90 minutes. This indicates that cross-linking has occurred.

EXAMPLE IV

This example illustrates the preparation of inhibited starch products according to this invention utilizing a non-aqueous solvent system.

A total of 20 parts of waxy maize was suspended in 60 parts of dichloromethane. The starch suspension was stirred at room temperature and 1.0 part of succinyl guanidine was added. The mixture was then heated to reflux temperature and this temperature was maintained for three hours. The reaction mixture was then cooled and filtered. The starch product was purified by washing twice with acetone, twice with water, and air drying. The starch product had a sediment volume of 56.0 ml. while the base starch had no sediment. This indicates that cross-linking had occurred.

In summary, this invention provides a novel process for making starch esters and novel starch ester derivatives obtained thereby.

TABLE II

| Derivative No. | Starch base | Esterification reagent | | Reaction conditions | | | Sediment volume | |
| --- | --- | --- | --- | --- | --- | --- | --- | --- |
| | | Guanidine derivative | Percent on starch | pH | Temp., °C. | Time, hrs. | Product | Base |
| 10 | Waxy maize | Terephthalic acid | 10.0 | 8.0 | RT | 16 | 31.0 | None |
| 11 | do | 1,4-cyclohexane dicarboxylic acid | 10.0 | 8.0 | RT | 16 | 16.5 | None |
| 12 | do | Succinic acid | 1.0 | 8.0 | RT | 1 | 25.0 | None |
| 13 | do | do | 1.0 | 8.0 | RT | 16 | 18.0 | None |
| 14 | do | Adipic acid | 10.0 | 8.0 | RT | 16 | 7.5 | None |
| 15 | do | do | 1.5 | 4.0 | RT | 2 | 80.0 | None |
| 16 | do | do | 1.5 | 5.0 | RT | 2 | 57.0 | None |
| 17 | do | do | 1.5 | 6.0 | RT | 2 | 52.0 | None |
| 18 | do | do | 1.5 | 7.0 | RT | 2 | 35.0 | None |
| 19 | do | do | 1.5 | 8.0 | RT | 2 | 21.0 | None |
| 20 | do | do | 1.5 | 9.0 | RT | 2 | 22.0 | None |
| 21 | do | do | 1.5 | 10.0 | RT | 2 | 20.0 | None |
| 22 | do | do | 1.5 | 8.0 | 2-3 | 2 | 45.0 | None |
| 23 | do | do | 1.5 | 8.0 | 48 | 2 | 17.0 | None |
| 24 | Waxy maize (acid converted to 85 fluidity) | Succinic acid | 1.5 | 8.0 | RT | 2 | 19.0 | None |
| 25 | Oxidized corn starch (75 fluidity) | do | 1.5 | 8.0 | RT | 2 | 28.0 | None |
| 26 | Potato starch | do | 1.5 | 8.0 | RT | 2 | 10.0 | 88.0 |
| 27 | Corn starch (previously treated with 3% diethylaminoethyl chloride hydrochloride). | Adipic acid | 1.5 | 8.0 | RT | 2 | 42.0 | None |
| 28 | Waxy maize | Succinic acid | 0.1 | 8.0 | RT | 2 | 56.0 | None |
| 29 | do | Adipic acid | 70.0 | 8.0 | RT | 2 | 10.0 | None |

The degree of inhibition was determined by cooking an aqueous suspension of the resulting starch product, having a concentration of 1% solids, by weight, in a boiling water bath for a period of 30 minutes. The cooked dispersion was then allowed to stand, at room temperature, in a 100 ml. graduated cylinder for a period of approximately sixteen hours. In order to show comparative values, the cookability of the base starch was also determined by this method.

EXAMPLE III

This example illustrates the preparation of a non-granular, cross-linked starch product prepared by using a previously gelatinized starch base.

A total of 10 parts of an acid hydrolyzed waxy maize (85 fluidity) starch was suspended in 40 parts of water. The suspension was heated on a boiling water bath for 20 minutes and then cooled to room temperature. The pH of the thus-gelatinized starch was adjusted to 8.0 with dilute sodium hydroxide solution. Thereafter, the cooled starch dispersion was stirred and 1.0 parts of succinyl guanidine added. A pH of 8.0 was maintained by the periodic addition of dilute hydrochloric acid during the course of the reaction. The reaction mixture exhibited a

We claim:
1. A process for preparing esters of a starch base having free reactive hydroxyl groups comprising the steps of:
   (a) reacting said starch base with an acyl guanidine at a temperature of 35° F. to 120° F. for a period of 1 to 24 hours, the amount of acyl guanidine used being from about 0.05 to 100% based on the dry weight of starch, and
   (b) isolating the resultant starch ester.
2. A process according to claim 1 wherein said starch base is reacted with said acyl guanidine in an aqueous medium at a pH of from about 4.0 to about 11.0.
3. A process according to claim 1 wherein the reaction is carried out in a non-aqueous medium.
4. A process according to claim 1 wherein the starch base is corn starch.
5. A process according to claim 1 wherein the starch base is waxy maize.
6. A process according to claim 1 wherein the starch base is reacted with the diguanidine derivative of succinic acid.
7. A process according to claim 1 wherein the starch base is reacted with the diguanidine derivative of adipic acid.

(References on following page)

References Cited

UNITED STATES PATENTS

| | | | |
|---|---|---|---|
| 3,461,115 | 8/1969 | Schwarzer | 260—232 |
| 2,372,337 | 3/1945 | Pacsu et al. | 260—233.5 |
| 2,461,139 | 2/1949 | Caldwell | 260—233.5 |
| 2,362,282 | 11/1944 | Lindsay | 260—233.5 |
| 2,589,226 | 3/1952 | Carson | 260—233.5 |
| 2,914,526 | 11/1959 | Paschall | 260—233.5 |
| 3,281,411 | 10/1966 | Lemmerling | 260—233.5 |
| 3,549,619 | 12/1970 | Mark et al. | 260—233.5 |

DONALD E. CZAJA, Primary Examiner

M. I. MARQUIS, Assistant Examiner

U.S. Cl. X.R.

106—213; 117—139.5 C, 148; 260—233.3 A, 233.3 R